(12) United States Patent
Corsini

(10) Patent No.: US 8,806,343 B2
(45) Date of Patent: Aug. 12, 2014

(54) SYSTEM AND METHOD FOR HANDLING A DATA REFRESH PROCEDURE IN A PRODUCTION EXECUTION SYSTEM

(75) Inventor: Giorgio Corsini, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 1403 days.

(21) Appl. No.: 12/079,231

(22) Filed: Mar. 25, 2008

(65) Prior Publication Data

US 2009/0019368 A1 Jan. 15, 2009

(30) Foreign Application Priority Data

Mar. 29, 2007 (EP) ..................................... 07006450

(51) Int. Cl.
*G06F 3/00* (2006.01)
*G06F 19/00* (2011.01)

(52) U.S. Cl.
USPC ........................................... 715/733; 700/97

(58) Field of Classification Search
USPC ......... 715/733, 735, 736, 741, 742, 743, 764; 700/83, 95, 97; 709/223, 238; 713/164, 713/166; 726/1, 2, 26, 27
See application file for complete search history.

(56) References Cited

U.S. PATENT DOCUMENTS

| 7,216,007 | B2 * | 5/2007 | Johnson ........................... 700/83 |
| 7,536,548 | B1 * | 5/2009 | Batke et al. .................... 713/166 |
| 2004/0039468 | A1 * | 2/2004 | Zahorack et al. ............... 700/97 |
| 2005/0114487 | A1 | 5/2005 | Peng et al. |

FOREIGN PATENT DOCUMENTS

WO WO 01/27759 A2 4/2001
WO WO 03/096212 A1 11/2003

OTHER PUBLICATIONS

Gamma et al.: "Design Patterns: Elements of Reusable Object-Oriented Software", 1995, Addison-Wesley Professional, ISBN: 0201633612, pp. 293-303.

* cited by examiner

*Primary Examiner* — Haoshian Shih
(74) *Attorney, Agent, or Firm* — Laurence A. Greenberg; Werner H. Stemer; Ralph E. Locher

(57) ABSTRACT

A system for handling a data refresh procedure in a production execution system includes a network having data processing units running a MES software for controlling and monitoring a production process operating production components. A production modeler within the MES software defines a business logic that includes a plant model of the production process and the operating procedures for the production components in a graphical environment. A client application builder within the MES software provides a WEB based graphical user interface for generating cross-functionality graphic screens that form part of the network as presentation clients and display data stemming from the production components and being manipulated by the production modeler, where required. The production modeler defines a presentation logic operating the cross-functionality graphic screens, and updates the data at the presentation clients exclusively when the business logic requires the update to the presentation logic.

10 Claims, 1 Drawing Sheet

SYSTEM AND METHOD FOR HANDLING A DATA REFRESH PROCEDURE IN A PRODUCTION EXECUTION SYSTEM

BACKGROUND OF THE INVENTION

The present invention relates to a system and a method for handling a data refresh procedure in a production execution system.

In the world of process automation and process monitoring standard automation systems for controlling the widest conceivable variety of machines and plants are state of the art. Such technology covers in particular a broad range of products which are offered by the Siemens Corp. under its SIMATIC® product family with the field of manufacturing execution systems (MES). An extensive line of products for solving the technical tasks in question such as counting, measuring, positioning, motion control, closed-loop control and cam control enhance the performance capabilities of appropriate process controllers. A variety of configurations enable the implementation of flexible machine concepts.

In this context, a broad range of IT solutions exist to connect the actual hard ware close to the technical and/or logistical process to the application layer of the client driving the installation. Manufacturing execution systems have been developed to meet all of the requirements of a service oriented architecture (SOA) to integrate into a totally integrated automation (TIA). A plug & play architecture, in which the individual functions can be easily combined and configured with each other thereby forms the basis for this success thereby simplifying the complex structures of controlling a manufacturing plant or the like.

These demands often require in the backbone rather complicated and sophisticated software solutions which enable the approach of totally integrated automation. In view of this, the software engineers often use production moduler to define the plant model and its standard operating procedures and create the respective new software by means of a high level graphical language which identifies the workflow of activities within the software. Subsequently, this string/term of high level graphical language is translated into a client based software language executable on the machine language level. This translation requires tremendous efforts in programming and needs serious testing to check whether the translated program behaves the same as the original string/term of the high level graphical language.

Further, a demand for displaying data exists for the purpose of controlling and monitoring the plant operation. The presentation logic for displaying the data is today widely independent from the business logic that define the operating procedures according to the plant model. Therefore, two mechanisms are normally used to manage the presentation logic.

The first mechanism is polling of data meaning every presentation client periodically asks the main process control system for new data handled on a data server. Often, the main control system is overloaded by this mechanism since useless requests have to be executed causing network traffic competing with the normal operation workflow of the business logic. Unfortunately, if data do not change frequently, most requests according to this mechanism are useless and a burden to the process control system.

The second mechanism can be strapline-like described as a publish-subscribe-mechanism as this is known, for example, for the CORBA messaging service. Following this mechanism, each presentation client subscribes itself to receive refreshed data when they are available. This mechanism is significantly better than the first one, but the logic required to set-up the subscription and the execution is not at all connected to the business logic that is designed and executed by the production modeler. As such, this mechanism cannot be optimized and tuned according to the real system capacity since the data refresh procedure has to be programmed individually at the presentation client.

For these reasons, the business logic and the presentation logic must be intensively mixed and connected to each other which requires a tremendous amount of coordination between those two logical areas. In addition, the coordination is often a source for failures since the users have to manage the business logic and the presentation logic using different configuration tools or development environments.

SUMMARY OF THE INVENTION

It is therefore the aim of the present invention to provide a system and a method for handling a data refresh procedures which feature by a less complex structure to handle both the business logic and the presentation logic.

This aim is achieved according to the invention by a system and method for handling a data refresh procedure in a production execution system. In such a system, a network has a number of data processing units running a MES software for controlling and monitoring a production process operating a number of production components. A production modeler within the MES software defines a business logic that includes a plant model of the production process and the related operating procedures for the production components in a fully graphical environment. A client application builder within the MES software provides a native, WEB based graphical user interface for generating cross-functionality graphic screens that form part of the network as presentation clients and display data stemming from the production components and being manipulated by the production modeler, where required. The production modeler further defines a presentation logic that operates the cross-functionality graphic screens with respect to their content of the data at the presentation clients. Further, the production modeler updates the data at the presentation clients exclusively when the business logic requires the update to the presentation logic.

These features now generate a new environment to handle both the business logic and the presentation logic being now centralized within the production moduler. This design dramatically reduces the system workload since the presentation logic only refreshes the data when the business logic comprises the respective demand. Considering the MES software, the production moduler uses now the same criteria (the same graphical language) to integrate the creation of the presentation logic into the process of creating the business logic. Therefore, the development and maintenance costs of the MES applications (procedures) are significantly reduced. Using the unique development environment for business and presentation logic, the skill requested from the uses are also reduced as well as the failure rate due to the decreased development and maintenance complexity. Furthermore, the overall plant control and monitoring network is not overloaded by useless network requests; the presentation clients to be refreshed can be selected according to a wide range of filtering criteria.

In a preferred embodiment, the update request required from the business logic selectably refreshes only one or more specific graphic screens. Further, the update request required from the business logic can be designed to selectively refresh only the graphic screen on a data processing unit where a selectable specific user is currently logged on. Furthermore, the update request required from the business logic selectively refreshes only one or more graphic screens that are assigned to selectable specific data processing unit. Alternatively, for specific refresh procedures such as an information to be displayed at all presentation clients the update request required from the business logic is broadcasted.

BRIEF DESCRIPTION OF THE SEVERAL VIEWS OF THE DRAWINGS

Preferred examples of the present invention are described hereinafter in detail by reference to the following drawings, wherein.

DETAILED DESCRIPTION OF THE INVENTION

Figure 1:
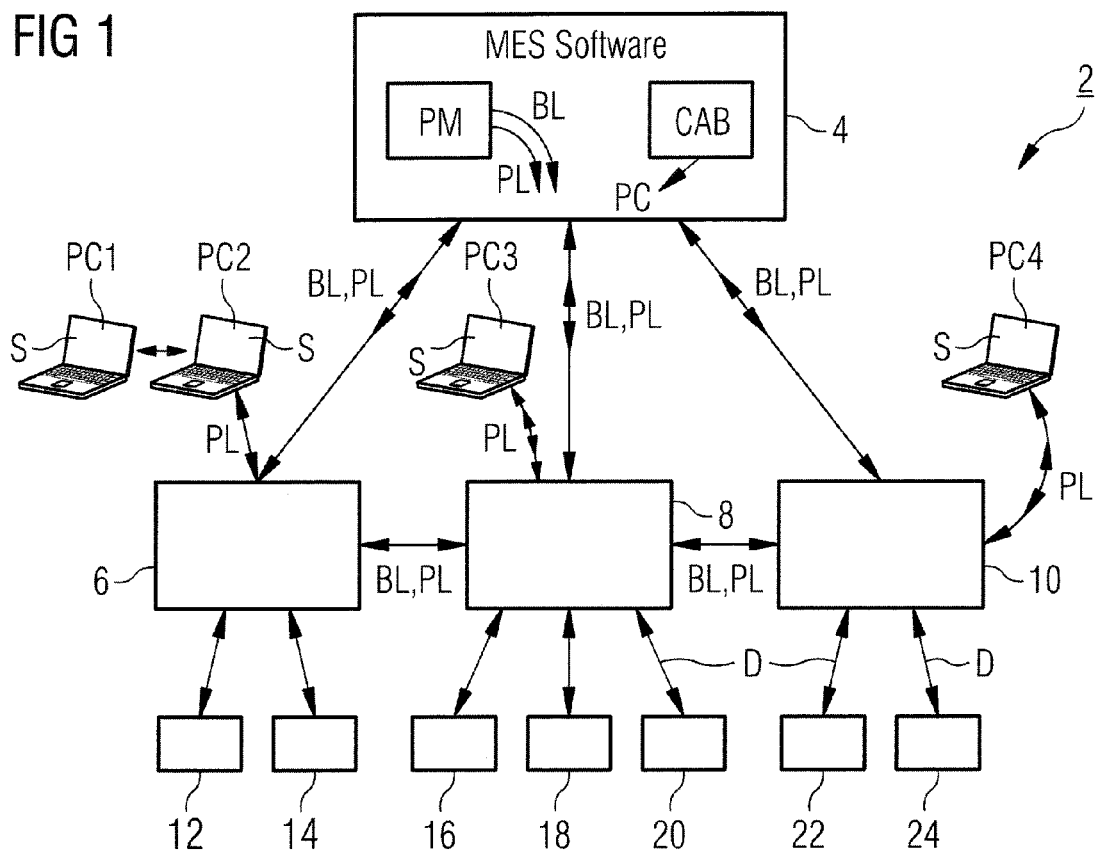
FIG. 1 shows a schematic overview of a system for handling a refresh procedure with a production execution system.

FIG. 1 illustrates a schematic overview of a plant control system 2 working as a manufacturing execution system (MES). The system/network 2 has a number of data processing units 4, 6, 8, 10 running a MES software for controlling and/or monitoring a production process operating a number of production components 12 to 24. The production components 12 bis 24 are sensors, actuators, motors, step drives, conveyors, valves, pumps or the like. The data processing units 4 to 10 are network computers which have logical units, calculation means, storage means, display means and the like. The data processing units 4 to 10 are connected within a plant network to exchange data to the required extent. One of the data processing units, hereinafter referred to a master console 4, executes the MES software for controlling and monitoring the operation of the plant.

The master console 4 comprises within the MES software a production modeler PM. This production moduler PM is enabled to define a business logic BL within a fully graphical environment as fascilitated by the MES software. The business logic BL, when finally generated by the production modeler, includes a plant model of the production process and the related operating procedures for the production components 12 to 24 in a fully graphical environment. Even for the creation of the business logic BL high-level graphical language is used within the MES software, preferably consistently with the ISA-95 standard.

The master console 4 includes a client application builder CAB within the MES software to provide a native, WEB based graphical user interface for generating cross-functionality graphic screens S that form part of the network 2 as presentation clients PC, PC1 to PC4 and display data D which is stemming from the production components 12 to 24 and which is manipulated from the business logic BL by the production modeler PM, where it is required, i.e., when the data stemming from one of the production components 12 to 24 has to further processed or averaged with data stemming from other production components.

The production modeler PM defines a presentation logic PL. The presentation logic is provided to operate the cross-functionality graphic screens S with respect to their content of the data D at the presentation clients PC1 to PC4. This presentation logic PL can be therefore developed within the same environment as used to define the business logic BL. For the development of the presentation logic PL within the production moduler PM, various symbols can be created each having a different function within the presentation logic PL. This is indicated by the bidirectional data links among the data processing units 4 to 10, marked with "BL, PL". Therefore, the highly developed graphical language to define the business logic BL includes the symbols to be added to the graphical workflow which serve exclusively to refresh selectable data for selectable presentation client PC1 to PC4 and/or for selectable users and/or for selectable data processing units. In other words, the production modeler PL is now additionally enabled to update the data at the presentation clients PC1 to PC4 exclusively when the business logic BL requires the update to the presentation logic PL.

Figure 2:
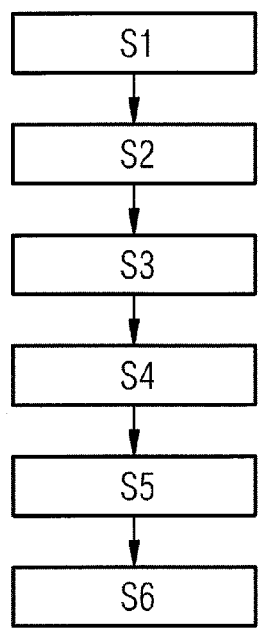
FIG. 2 shows a workflow for the refresh of a data indicating a material availability.

FIG. 2 illustrates a representative example within the MES environment. In order to execute a production order for a good, the quantity of the materials to be used must be selected by an operator. The operator requires both the display of the material on stock before and after his production order is executed. This information has to be displayed correctly on the presentation client to whom the operator is logged.

In a first step S1, the production operation has to be defined by the definition of the workflow which is a sequence of steps to be executed as the business logic. The business logic also comprises a command that the material quantity has to be refreshed after the production order is executed. For this definition process, the production moduler is used.

As soon as the production modeler PM now receives the command to execute this specific order, it starts to run in a second step S2 the associated production operation defined in step S1 which beside other routines checks for the material availability.

In a third step S3, the execution of the production operation comprises within the business now a command to send a message to the presentation client to whom the operator is currently logged. This command is requiring the operator to input the material quantity to be allocated to satisfy the production order.

In a fourth step S4, this information is received by the production operation that generates subsequently an appropriate material lot in a material manager associated with the MES software environment.

In a fifth step S5, the production operation is executed and will be finalized by the fulfillment of the production order.

As part of the process of the development of the business logic, the presentation logic to refresh specific data at specific presentation clients has been developed in parallel within the same development environment offered by the production modeler as explained under the step S1. For that reason, the business logic now requires in a sixth step S6 the presentation logic to refresh the data of the material stock by sending a message to the presentation client to whom the operator is still logged. This message causes the presentation logic at the presentation client to refresh the material information on the respective graphic screen.

As described earlier, all these development activities including both the respective business logic and the presentation logic to refresh the specific data at specific presentation clients have been defined in a unique graphical programming environment.

What is claimed is:

1. A system for handling a data refresh procedure in a production execution system, comprising:
   a network having a number of data processing units running a MES software for controlling and monitoring a production process operating a number of production components;
   a production modeler within the MES software enabled to define a business logic, said business logic comprising a plant model of the production process and the related operating procedures for the production components in a fully graphical environment;

a client application builder within the MES software enabled to provide a native, WEB based graphical user interface for generating cross-functionality graphic screens, said screens forming part of the network as presentation clients and displaying data stemming from the production components and being manipulated by the production modeler, where required;

said production modeler enabled additionally to define a presentation logic, said presentation logic operating the cross-functionality graphic screens with respect to their content of the data at the presentation clients; and said production modeler additionally enabled to update the data at the presentation clients exclusively when the business logic requires the update to the presentation logic.

2. The system of claim 1, wherein the update request required from the business logic is enabled to selectably refresh only one or more specific graphic screens.

3. The system of claim 1, wherein the update request required from the business logic is enabled to selectively refresh only the graphic screen on a data processing unit where a selectable specific user is currently logged on.

4. The system of claim 1, wherein the update request required from the business logic is enabled to selectively refresh only one or more graphic screens that are assigned to selectable specific data processing unit.

5. The system of claim 1, wherein the update request required from the business logic is broadcasted.

6. A method for handling a data refresh procedure in a production execution system, comprising:

providing a network having a number of data processing units running a MES software for controlling and monitoring a production process operating a number of production components;

providing a production modeler within the MES software enabled to define a business logic, said business logic comprising a plant model of the production process and the related operating procedures for the production components in a fully graphical environment;

providing a client application builder within the MES software enabled to provide a native, WEB based graphical user interface for generating cross-functionality graphic screens, said screens forming part of the network as presentation clients and displaying data stemming from the production components and being manipulated by the production modeler, where required;

enabling said production modeler for additionally defining a presentation logic, said presentation logic operating the cross-functionality graphic screens with respect to their content of the data at the presentation clients; and enabling said production modeler additionally to update the data at the presentation clients exclusively when the business logic requires the update to the presentation logic.

7. The method of claim 6, wherein the update request required from the business logic is enabled to selectably refresh only one or more specific graphic screens.

8. The method of claim 6, wherein the update request required from the business logic is enabled to selectively refresh only the graphic screen on a data processing unit where a selectable specific user is currently logged on.

9. The method of claim 6, wherein the update request required from the business logic is enabled to selectively refresh only one or more graphic screens that are assigned to selectable specific data processing unit.

10. The method of claim 6, wherein the update request required from the business logic is broadcasted.

* * * * *